July 15, 1952 G. E. SAENZ 2,603,143
PASTRY SHELL FRYING MACHINE
Filed May 11, 1950 4 Sheets-Sheet 1

George E. Saenz
INVENTOR.

July 15, 1952  G. E. SAENZ  2,603,143
PASTRY SHELL FRYING MACHINE
Filed May 11, 1950  4 Sheets-Sheet 2
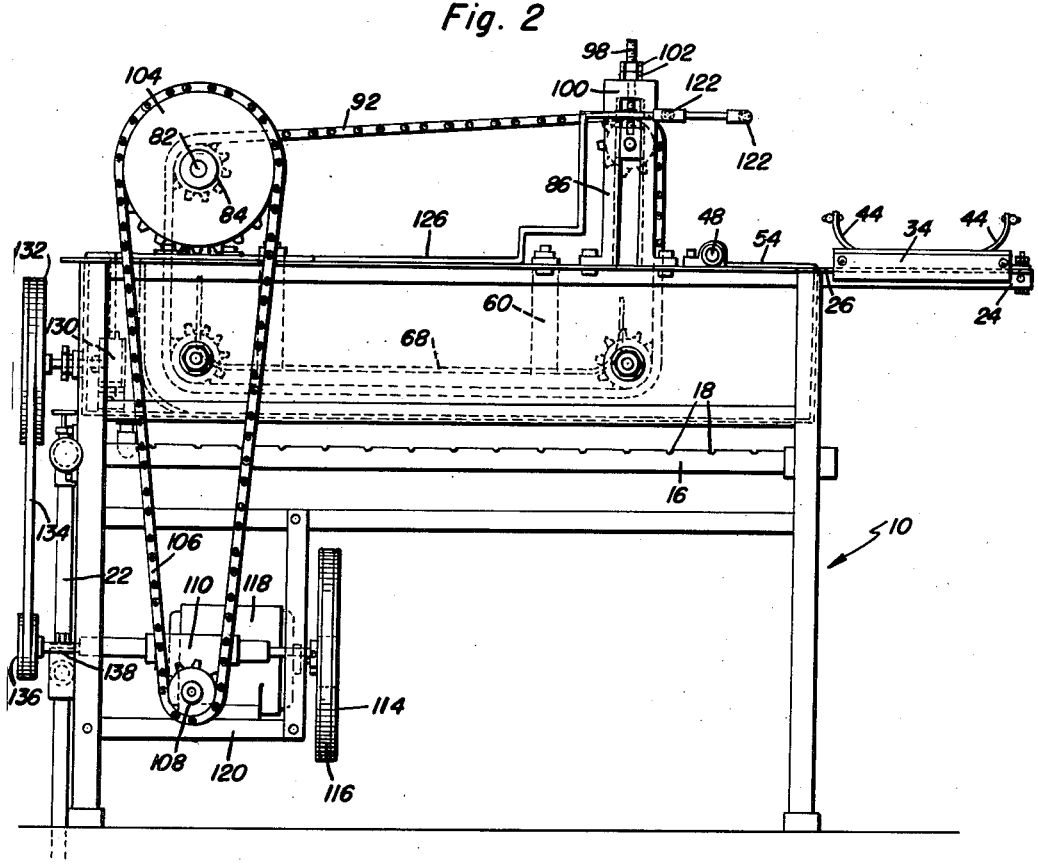
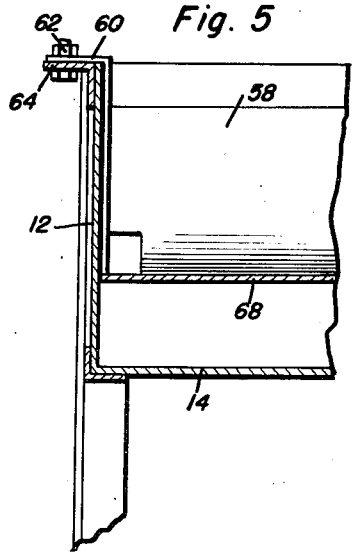
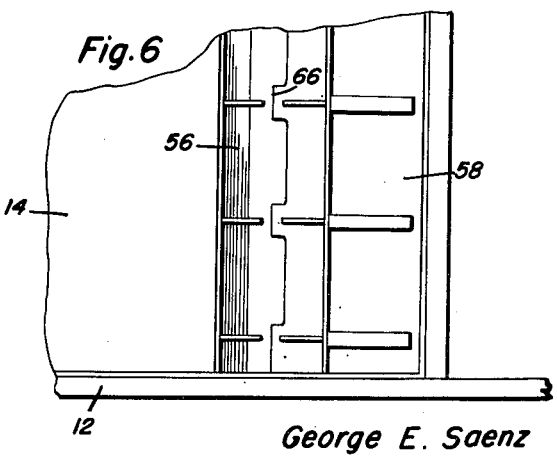
George E. Saenz
INVENTOR.

George E. Saenz
INVENTOR.

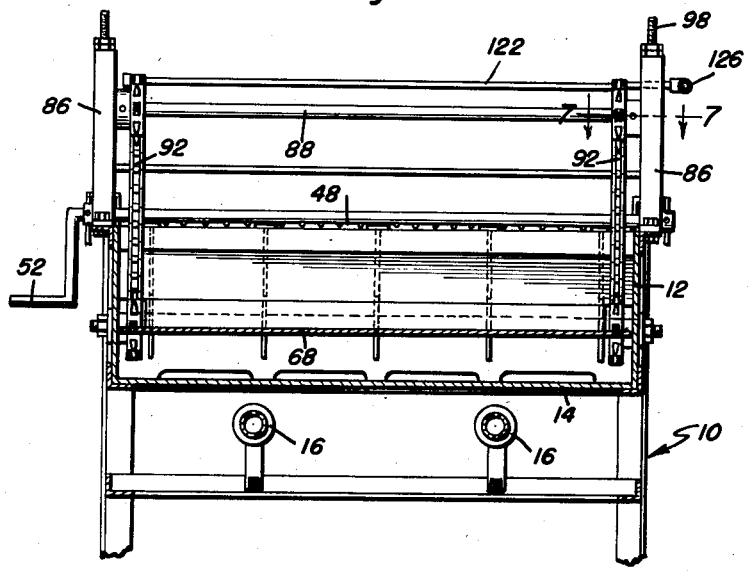
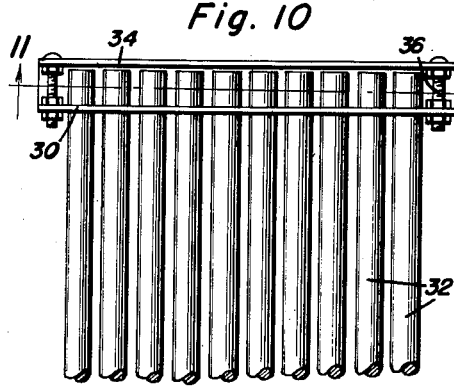
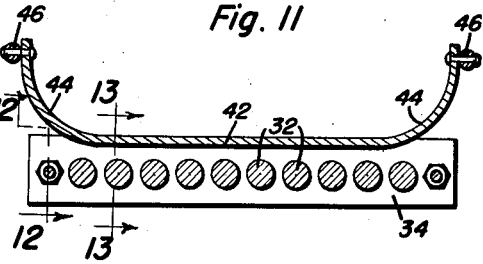
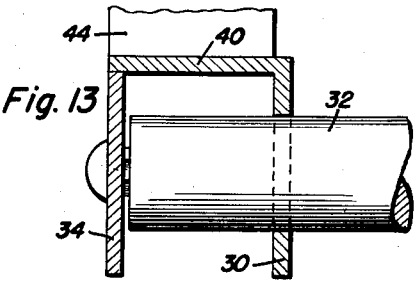
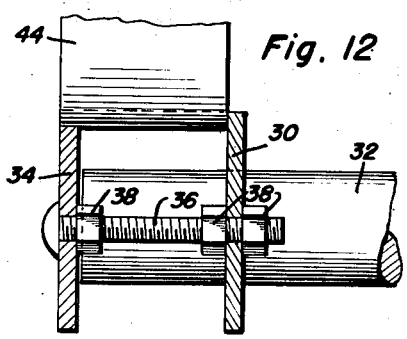
George E. Saenz
INVENTOR.

Patented July 15, 1952

2,603,143

UNITED STATES PATENT OFFICE 2,603,143

PASTRY SHELL FRYING MACHINE

George E. Saenz, Mercedes, Tex.

Application May 11, 1950, Serial No. 161,289

8 Claims. (Cl. 99—353)

This invention comprises novel and useful improvements in a pastry shell frying machine and more specifically pertains to an apparatus for automatically folding pastry blanks and frying the same in an improved manner in a tank of fat, and more especially pertains to the making of a pastry shell known as a Taco shell.

The principal object of this invention is to provide an apparatus for forming pastry shells in an improved manner.

A further object of this invention is to provide an apparatus for forming pastry shells and having an improved construction for depositing preformed pastry blanks into the frying tank of fat.

Yet another important object of the invention is to provide an apparatus in conformity with the foregoing objects which shall provide means whereby a pastry shell, upon being delivered into a tank of fat, may be reversed therein for imparting a preliminary frying action to both sides of the blank, and for applying and spraying an oil coating thereon.

Yet another important object of the invention is to provide an apparatus as set forth in the foregoing objects wherein there is provided an automatic and improved mechanism for folding a pastry blank; and for moving the folded pastry blank throughout the deep fat frying tank.

And a final important feature and object of the invention, to be specifically enumerated herein, is to provide a compact and portable apparatus for automatically effecting the forming of an edible, folded pastry shell from various edible pastry materials.

These, together with various ancillary features and objects of the invention which will later become apparent as the following description proceeds, are attained by the present invention, a preferred embodiment of which has been illustrated, by way of example only, in the accompanying drawings, wherein:

Figure 2 is a side elevational view of the apparatus shown in Figure 1;

Figure 4 is a vertical transverse sectional view taken substantially upon the plane indicated by the section line 4—4 of Figure 1;

Figure 5 is an enlarged, vertical transverse sectional detail view through the deep fat frying tank and showing the manner in which a guide element is secured therein;

Figure 6 is a fragmentary top plan view, taken upon an enlarged scale, of a portion of the baffle construction forming a part of the invention;

Figure 10 is a fragmentary bottom view of a portion of a delivery carriage for discharging pastry blanks into the deep fat frying tank of the apparatus;

Figure 11 is a vertical longitudinal sectional view taken substantially upon the plane indicated by the section line 11—11 of Figure 10;

Figure 12 is a vertical transverse sectional view taken substantially upon the plane indicated by the section line 12—12 of Figure 11;

Figure 13 is a vertical transverse sectional view taken substantially upon the plane indicated by the section line 13—13 of Figure 11.

Figure 1:
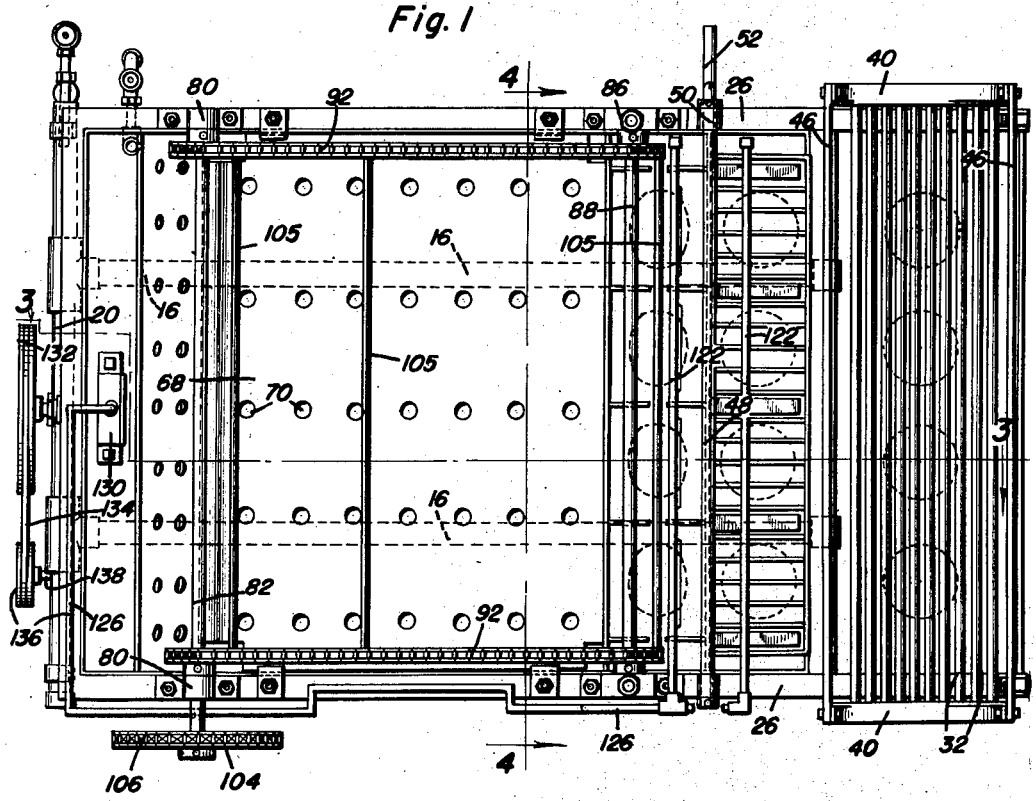
Figure 1 is a top plan view showing one suitable embodiment of apparatus embodying therein the principles of this invention.

Referring now more specifically to the accompanying drawings, wherein like numerals designate similar parts throughout the various views, it will be seen that the numeral 10 designates generally a supporting stand or framework of any desired character, and upon which is mounted a deep fat frying tank 12 which is open at its top and is provided with a bottom wall 14. Means are provided for heating the fat contained within the tank 12 and while any suitable means may be employed for this purpose, there has been illustrated a conventional form of heater consisting of a plurality of gaseous fuel discharge conduits 16 disposed beneath the bottom 14 of the tank, these conduits being provided with suitable orifices 18 by means of which a series of flames may be directed against the bottom of the tank. Conduits 16 may communicate with a common fuel supply manifold or header 20, obtaining fuel from a supply pipe 22, through the agency of suitable control valves and the like, whose arrangement and construction is conventional and in itself forms no part of the present invention.

While the deep fat frying tank may be of any desired construction, proportions and material, the same may conveniently be formed of a suitable sheet metal material, and when constructed in a size substantially forty inches long by thirty inches wide and nine inches deep, holds about 240 lbs. of grease, and is suitable for the operation of an apparatus capable of producing twelve of the pastry shells per forty-five seconds of operation.

Suitably attached to the upper portion of the inner wall of the tank 12 at one end thereof is a pair of laterally extending support members 24, which may conveniently consist of an angle iron construction, and which are provided with a horizontally disposed flange 26 upon their upper surfaces which constitutes a pair of support rails for movably supporting a carriage constituting a means for delivering pastry dough blanks into the tank. Conveniently, an angle iron member 28 may be secured to the outer ends of the support members 24, in order to form a stop or abutment at the outer ends of the track surfaces 26.

The novel carriage assembly, in accordance with this invention, and which is slidably received upon the supporting rails or tracks 26, comprises a pair of side members 30 having a plurality of apertures which rotatably receive a plurality of rods or rollers 32, any convenient number such as ten being employed. The rollers 32 rest directly upon the supporting rails 26, while the side members 30 overhang the ends of the same, as will be readily apparent from Figure 1. In order to retain the rollers in the side members 30, a side plate at each side of the device is provided, the same consisting of a flat plate 34 which is secured in spaced relation and in parallel disposition to the side members 30, as by means of a fastening bolt 36, together with suitable locking nuts 38 threaded thereon, as shown in Figure 12. The side plates 34 overlying the ends of the rollers 32 prevent their lateral displacement from the side members 30, and thus retain the set of rollers in assembled relation upon the side members 30 and the side plates 34.

As will be readily apparent from Figures 11-13, the side plates 30 may conveniently comprise angle iron members having horizontally disposed flanges 40 which overlie the space between the elements 30 and 34, while the side plates 34 are in turn provided with horizontally disposed flanges 42 which are curled upwards at their ends, as at 44, and are rigidly attached as by transverse bars 46, see Figure 1.

The arrangement is such that a plurality of pastry dough blanks may be placed upon the upper surface of the rollers 32, as indicated in dotted lines in Figure 1, and by grasping one of the transverse members 46 which thus functions as a handle, the entire carriage may be rolled upon the supporting tracks 26 towards the tank 12. During this movement, the rollers 32 are rolled upon the track surface, and the upper surfaces will cause the pastry dough blanks to travel forwardly upon the rollers themselves and eventually be discharged into the frying tank from the end of the carriage.

Figure 9:
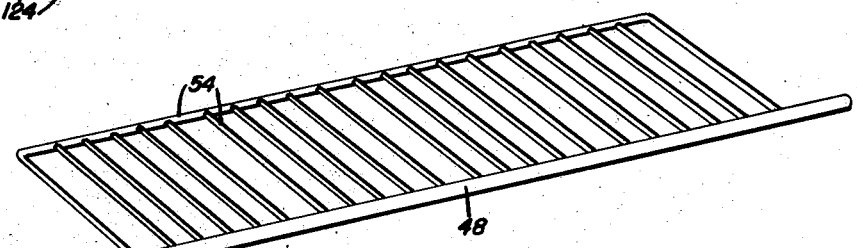
Figure 9 is a perspective view of the pastry blank turning means forming a part of the invention.

Means are provided for receiving the pastry dough blanks discharged from the carriage into the deep fat frying tank, for supporting these blanks, and then for reversing their position in the tank. This means, as shown best in Figures 1, 4 and 9, comprises a grill having a supporting rod 48 which extends across the top of the side walls of the tank 12, and is rotatably journaled and supported thereon by any suitable bearing brackets such as those indicated at 50. The extremity of the rod 48 is provided with a crank arm 52 by means of which the same may be oscillated as set forth hereinafter. That portion of the rod 48 which extends between the side walls of the tank is provided with a flat, grid-like supporting surface consisting of suitable laterally extending rods 54 which are of sufficient length to extend substantially between that end wall of the tank 12 which is adjacent to the delivery means, and as will be readily apparent from Figure 1. In operation, this grid is disposed in a horizontal position for receiving the pastry blanks discharged by the carriage, and upon manual operation of the handle 52, is rotated through substantially 180°, as indicated in dotted lines in Figure 3, for lifting, reversing and discharging the blanks into a compartment for folding the blanks.

This blank folding compartment consists of a pair of baffles, 56 and 58, which extend between the side walls of the tank, and as shown in Figure 5 are secured by supporting brackets 69 and bolts 62 to the horizontal flange 64 at the upper end of the tank side walls. These baffles at their lower ends terminate in spaced relation to each other, the baffle 56, as shown more clearly in Figures 3 and 6, having its lower edge resting upon the bottom wall 14, this lower edge being notched as at 66 to permit passage of the grease from one side of the baffle to the other. The baffle 58 terminates above the lower end of the tank, and the lower portions of these two baffles are inclined downwardly and towards each other to provide a restricted throat or opening therebetween. The spacing between these baffles at their upper ends is such as to cause slight bending of the pastry dough blank when the same is discharged between the baffles by the reversing or turning mechanism, as shown in dotted lines in Figure 3, whereby, when the blank is forced downwardly through the opening between the baffles, and discharged from the lower end or throat thereof, as set forth hereinafter, the blank will be folded upon itself into a substantially V-shaped form. Adjacent its lower end, the baffle 58 is secured to or forms a part of a guide plate 68, which extends throughout a substantial portion of the tank 12 and is disposed in spaced, parallel relation to the bottom wall of the same, this shield likewise extending substantially between the side walls of the tank, and being of a foraminous construction provided with apertures or the like 70. A restricted tunnel or passage is thus provided between this shield 68 and the bottom wall of the tank 14 for a purpose which will be later apparent. At its other end, the shield has its bottom wall upturned, as at 72, this shield being supported by the above mentioned supporting brackets 60.

An improved conveyor mechanism is provided for engaging the dough blanks discharged between the baffle members, and for carrying the blanks from the throat between the baffle members to complete the folding operation upon the blanks and then move the folded blanks through the restricted space between the guide member 68 and the bottom wall 14 of the tank, to complete the deep fat frying operation upon the blanks. The conveyor assembly intended for this purpose consists of a pair of transversely disposed axles 74 and 76 which are suitably journaled in the side walls of the tank and below the level of fat therein, these axles each having a pair of sprocket gears 78 disposed adjacent the side walls of the tank.

At what may be termed the rear end of the tank, a pair of journal supports 80 are mounted and a further transversely disposed shaft 82 is journaled therebetween, this shaft being likewise provided with a pair of sprockets 84. Finally, a pair of supporting brackets 86 are mounted at what may be termed the front end of the tank and above the shaft 74, and constitute adjustable journals for receiving the transverse shaft 88 having a pair of sprockets 90 thereon. A sprocket chain 92 is entrained over each of the four sprockets 78, 78, 84 and 90, in a vertical plane adjacent each side wall of the tank.

Figure 7:
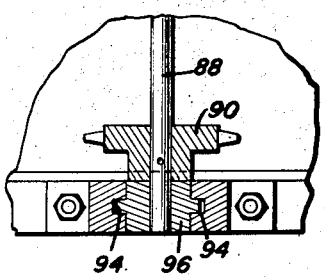
Figure 7 is a horizontal sectional detail view taken substantially upon the plane indicated by the section line 7—7 of Figure 4 and illustrating, in particular, one of the conveyor chain adjusting elements forming a part of the invention.
Figure 3:
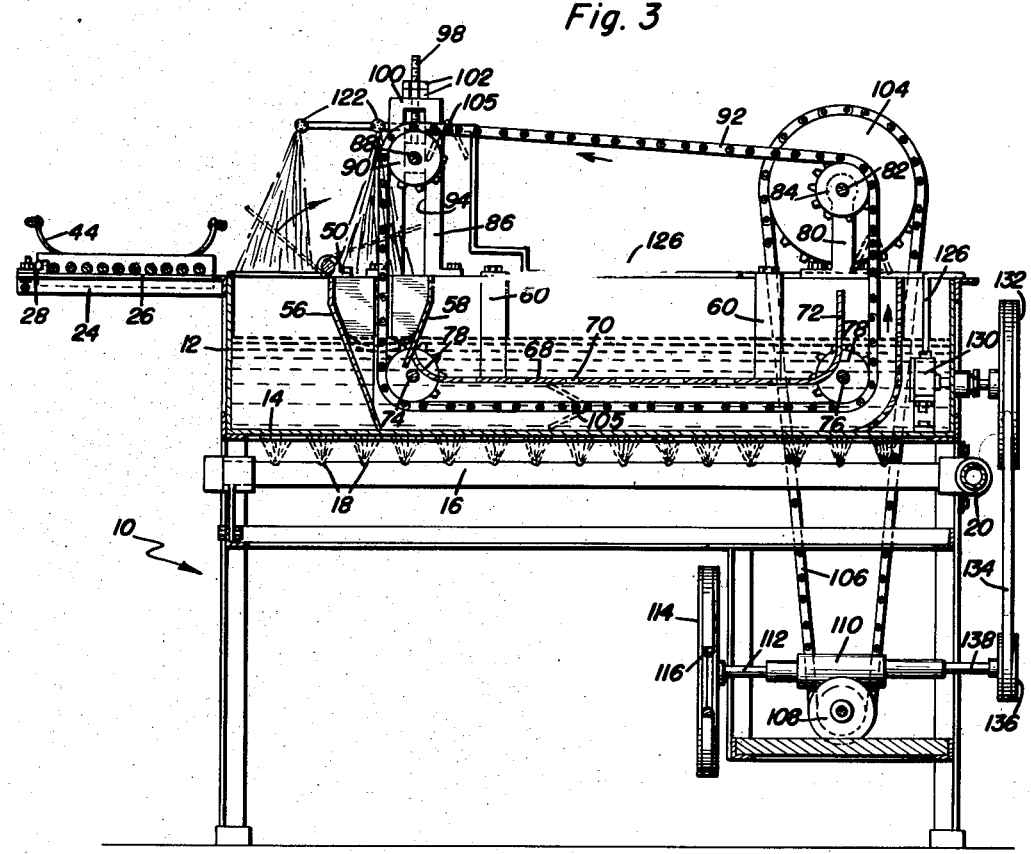
Figure 3 is a vertical longitudinal sectional view through the apparatus of Figure 1, taken substantially upon the plane indicated by the section line 3—3 thereof.

It may be here noted that, as shown in Figures 3 and 7, the adjustable journal is provided with vertically disposed guide slots 94, by means of which journal blocks 96 are retained for vertical sliding movement. The above mentioned shaft 88 is rotatably received in the journal box 96, so that upon vertical adjustment of this journal box, the chains 92 may be selectively tensioned as necessary.

Conveniently, this journal box may be vertically adjusted as by means of an upwardly extending screw-threaded member 98, extending through an aperture in a yoke 100 at the upper end of the bearing supports 86, and by means of adjusting nuts 102 threaded upon the member 98 and which bear against the upper surface of the yoke.

The pair of sprocket chains 92 are thus entrained over the four sprocket wheels, and extend into the compartment between the pair of baffles, through the throat at the lower end of the baffle, through the restricted passage or tunnel between the shield 68 and the bottom wall 14, and upwardly parallel to the end portion 72 of the shield, and from thence over the pulleys 84 and 90. To complete the conveyor assembly, the pair of chains 92 are provided with any suitable number of carrier bars 105 secured therebetween.

Operation of the conveyor assembly is effected by providing a sprocket wheel 104 secured to one of the shafts, such as 82, and this wheel is operatively connected as by a sprocket chain 106 to a sprocket wheel 108 driven through a reduction gearing assembly, indicated generally at 110, and by means of a driving shaft 112, this driving shaft in turn being provided with a pulley 114 coupled, as by a driving belt 116, with an electric motor 118. The motor 118, reduction gearing assembly 110 and the associated elements may be supported as by a supporting platform 120 suitably attached to a portion of the supporting framework 10.

Figure 8:
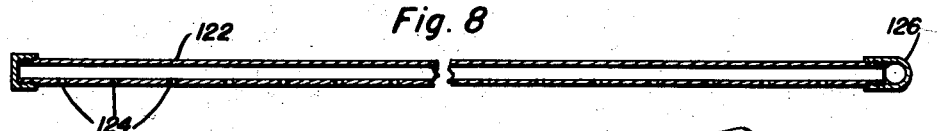
Figure 8 is a fragmentary horizontal sectional view through one of the oil spraying conduits forming a part of this invention.

Means are provided for applying or spraying oil to both sides of the dough blanks prior to their immersion in the deep fat for deep fat frying. This means conveniently comprises a pair of laterally disposed conduits 122 and 122, one of these conduits being shown in section in Figure 8. These conduits extend transversely across the tank, as shown in Figures 1 and 3, and are provided with a plurality of orifices 124 upon their lower surfaces for spraying or discharging oil downwardly. The conduits are so placed that one conduit will discharge or spray oil directly upon the pastry shell blanks as the same are supported upon the grid of the reversing means, that is, while the blanks are supported between the baffle 56 and the end wall of the tank 12; while the other conduit is positioned for discharging spray upon blanks which have been reversed and discharged into the space between the baffles 56 and 58.

Oil is supplied under pressure to these conduits through a suitable piping system consisting of the members 126, 122, and a liquid gear pump 130 of any suitable construction, this pump obtaining the oil to be sprayed from any suitable source or supply, not shown. The pump itself may be mounted conveniently upon the side of the tank, or if desired may be positioned upon the interior of the tank, the same being operated by a pulley 132 attached to one of the shafts of the gear pump, and a belt 134 driven by pulley 136 mounted upon a shaft 138 extending from the reduction gearing assembly 10.

From the foregoing, it is thought that the construction of the device will now be understood and the operation of the same is as follows: Any suitable pastry material for forming pastry shells is applied manually or in any desired manner in the form of flat cakes or the like upon the delivery carriage structure. With the blanks placed as indicated by dotted lines in Figure 1, the carriage is then moved toward the tank, the rotation of the rollers upon the rails of the support serving to feed or move the blanks forwardly, until the same are discharged into the dotted line position shown in Figure 1 upon the surface of the grid of the reversing means. While in this position, they are treated with the sprayed oil, and after a few seconds of exposure to the heating effect of the grease within the tank, the reversing mechanism is manually operated by its crank 52 and the blanks are moved as shown in dotted lines in Figure 3 through substantially 180°, being reversed and discharged into the space between the baffles 56 and 58, whereupon they are again treated with the sprayed oil. In this position, owing to the size and spacing of the baffles, the edges of the blanks are caused to fold slightly so that the blanks assume a dished position, as shown in dotted lines in Figure 3. While in this position, they are engaged upon the upper surfaces by the approaching carrier bar of the conveyor assembly, which thus pushes the blank downwardly through the throat of the folding mechanism and draws the blank in bent or folded form from this throat and below the surface of the heated fat. The space between the shield 68 and the bottom 14 is such that the folded edges of the blanks are prevented from unfolding, and thus maintained in their folded position upon the carrier bar and are thus dragged through this tunnel or passage, and are fried during this process. Emerging from the other end of this restricted tunnel or passage, the blanks are now lifted, and during this lifting operation the extremity 72 of the guide is disposed sufficiently close to the conveyor chain 92 to prevent the blanks pivoting about their carrier bars and dropping from the same, and as the blanks approach the discharge station which may be at any place along the upper flight of the chain 92, they may be manually removed and are ready for use.

Figure 14:
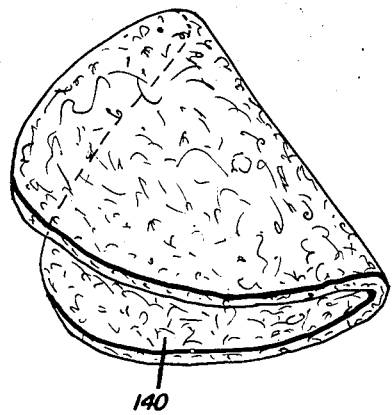
Figure 14 is a perspective view showing one of the completed pastry shells fabricated by this invention.

From the foregoing, the construction and operation of the device will now be understood and further explanation is believed to be unnecessary. It is obvious that the apparatus is capable of forming pastry shells or cakes and pastries of any desired character and of various edible materials, being especially adapted to form that type of pastry shell known to the trade as a Taco shell, one of these being indicated at 140 in Figure 14.

Since it is evident that various modifications and changes may be readily made without departing from the spirit of this invention, it is not desired to limit the invention except as required by the scope of the appended claims.

Having described the invention, what is claimed as new is:

1. A pastry shell frying machine comprising a deep fat frying tank, means for delivering pastry dough blanks into said tank, means for reversing the blanks in said tank, means for folding said blanks into a pastry shell, means for conveying said shells through said tank.

2. A pastry shell frying machine comprising a deep fat frying tank, means for delivering pastry dough blanks into said tank, means for reversing the blanks in said tank, means for folding said blanks into a pastry shell, means for conveying said shells through said tank, means for oiling said blanks.

3. A pastry shell frying machine comprising a deep fat frying tank, means for delivering pastry dough blanks into said tank, means for reversing the blanks in said tank, means for folding said blanks into a pastry shell, means for conveying said shells through said tank, said delivering means consisting of support rails mounted on said tank, a carriage movable on said rails, said carriage comprising side members, transverse rollers journaled in said side members and resting upon said rails.

4. A pastry shell frying machine comprising a deep fat frying tank, means for delivering pastry dough blanks into said tank, means for reversing the blanks in said tank, means for folding said blanks into a pastry shell, means for conveying said shells through said tank, said delivering means consisting of support rails mounted on said tank, a carriage movable on said rails, said carriage comprising side members, transverse rollers journaled in said side members and resting upon said rails, side plates engaging the ends of said rollers and secured to said side members for retaining said rollers therein, said side plates having portions forming handles.

5. A pastry shell frying machine comprising a deep fat frying tank, means for delivering pastry dough blanks into said tank, means for reversing the blanks in said tank, means for folding said blanks into a pastry shell, means for conveying said shells through said tank, said reversing means including a griddle journaled in said tank and extending transversely thereof, means for rotating said griddle to alternate horizontal positions on opposite sides of its axis of rotation for reversing the position of blanks discharged into said tank.

6. A pastry shell frying machine comprising a deep fat frying tank, means for delivering pastry dough blanks into said tank, means for reversing the blanks in said tank, means for folding said blanks into a pastry shell, means for conveying said shells through said tank, said folding means comprising a transverse baffle secured to the walls of said tank, said baffles inclining downwardly and towards each other and forming a restricted throat between the lower ends for causing folding of blanks drawn therethrough.

7. A pastry shell frying machine comprising a deep fat frying tank, means for delivering pastry dough blanks into said tank, means for reversing the blanks in said tank, means for folding said blanks into a pastry shell, said folding means comprising throat means, means for conveying said shells through said tank, said conveying means comprising a pair of sprocket chains mounted for endless travel in said tank, a plurality of carrier bars extending transversely of said tank and mounted upon said chains, said carrier bars being movable through said throat and completing the folding of said blanks and conveying the folded blanks through said tank.

8. A pastry shell frying machine comprising a deep fat frying tank, means for delivering pastry dough blanks into said tank, means for reversing the blanks in said tank, means for folding said blanks into a pastry shell, said folding means comprising throat means, means for conveying said shells through said tank, said conveying means comprising a pair of sprocket chains mounted for endless travel in said tank, a plurality of carrier bars extending transversely of said tank and mounted upon said chains, said carrier bars being movable through said throat and completing the folding of said blanks and conveying the folded blanks through said tank, guide means in said tank spaced above the bottom thereof, said chains and carrier bars being movable between said guide means and bottom to prevent unfolding of said blanks.

GEORGE E. SAENZ.

REFERENCES CITED

The following references are of record in the file of this patent:

UNITED STATES PATENTS

| Number | Name | Date |
|---|---|---|
| 1,320,662 | Tomlinson | Nov. 4, 1919 |
| 1,495,450 | Smith | May 27, 1924 |
| 1,904,370 | Hunter | Apr. 18, 1933 |
| 1,926,313 | Smith | Sept. 12, 1933 |
| 1,965,241 | Hunter | July 3, 1934 |
| 2,352,447 | Powers et al. | June 27, 1944 |